United States Patent [19]

Hudson

[11] Patent Number: 4,507,273

[45] Date of Patent: Mar. 26, 1985

[54] OXIDATION PROCESS FOR PRODUCTION OF ACIDIC FERRIC SULPHATE

[75] Inventor: William G. Hudson, Grimsby, England

[73] Assignee: Tioxide Group PLC, United Kingdom

[21] Appl. No.: 497,597

[22] Filed: May 24, 1983

[30] Foreign Application Priority Data

Jul. 24, 1982 [GB] United Kingdom ............... 8221453

[51] Int. Cl.$^3$ .............................................. C01G 41/14
[52] U.S. Cl. .................................................. 423/558
[58] Field of Search .......................................... 423/558

[56] References Cited

U.S. PATENT DOCUMENTS 1,880,265 10/1932 Marsh et al. ..................... 423/558

FOREIGN PATENT DOCUMENTS 2654720 6/1977 Fed. Rep. of Germany .
2728047 1/1979 Fed. Rep. of Germany ...... 423/558

Primary Examiner—Howard S. Williams
Attorney, Agent, or Firm—Banner, Birch, McKie & Beckett

[57] ABSTRACT

Production of an acidic ferric sulphate from ferrous sulphate heptahydrate by drying the heptahydrate at a temperature within the range 40° to 50° C. and then at a temperature of from 54° to 65° C. to produce a partially dehydrated product containing from 3.8 to 5.2 mols $H_2O$ prior to oxidizing at a temperature of 150° C. to 300° C. to produce a product containing at least 85% by weight of the ferrous iron converted to ferric iron. The oxidized product is treated with sulphuric acid to introduce at least 1.5:1 of $SO_4:Fe^{3+}$. The product is eminently suitable for the treatment of domestic sewage.

10 Claims, No Drawings

OXIDATION PROCESS FOR PRODUCTION OF ACIDIC FERRIC SULPHATE

This invention relates to an oxidation process and particularly to a process for the production of acidic ferric sulphate from ferrous sulphate.

Copperas, $FeSO_4.7H_2O$, is a by-product of the titanium dioxide industry and is a source of iron compounds of commercial value. There is a need for an improved process for the production of acid ferric sulphate by the oxidation of copperas.

According to the present invention a process for the production of an acidic ferric sulphate which comprises:

(a) establishing a bed of ferrous sulphate heptahydrate and passing a heated gas through the bed to fluidize the bed and to heat the said ferrous sulphate to a temperature of from 32° C. to 38° C. to produce a free flowing and substantially aggregate-free product, (b) increasing the temperature of the fluidized $FeSO_4.7H_2O$ to a value within the range 40° C. to 50° C. to commence to remove water of crystallization of said $FeSO_4.7H_2O$ (c) when the amount of water of crystallization has fallen to less than 6 mols $H_2O$ per mol $FeSO_4$ increasing the temperature to a value of from 54° C. to 65° C. to complete the reduction of the amount of water of crystallization to produce a partially dehydrated product containing from 3.8 to 5.2 mols $H_2O$ per mol $FeSO_4$ while maintaining the material in steps (b) and (c) in fluid suspension, (d) heating the partially dehydrated product to a temperature of from 150° C. to 300° C. while maintaining the partially dehydrated product in fluid suspension by passing through the product an oxygen containing gas to oxidize at least 85% by weight $Fe^{2+}$ to $Fe^{3+}$, (e) adding to the oxidized product concentrated sulphuric acid in an amount sufficient to increase the mole ratio $SO_4:Fe^{3+}$ to at least 1.5:1 while maintaining the product in fluid suspension and at a temperature of 120° C. to 220° C., and (f) cooling the oxidized and acidified product while maintaining the product in fluid suspension to produce a solid free-flowing ferric sulphate having a mole ratio $SO_4:Fe^{3+}$ of at least 1.5:1.

The process of the present invention has some very important advantages principally in the possibility, as described later, of the use of waste heat of a titanium dioxide manufacturing process. High energy costs have been a feature of pigment producing processes for many years and the possiblity of recovery of heat by usage in a further process is highly attractive.

Solid ferric sulphate in the acidic form has many possible uses chief among which is in the treatment of potable water in the treatment of domestic sewage and for the treatment of clay solids to improve the texture and workability.

The present invention is a process which employs distinct drying, oxidation and acidification stages to produce the required acidic ferric sulphate with the material being treated in the fluidized form. Although the process can be operated in a batchwise manner using a single fluid energy bed advantageously the process is carried out in a continuous manner using a plurality of fluid beds with one bed for each process stage and the treated material being transferred at the end of each stage to the next bed.

Initially the process comprises a multi-stage drying process in which careful control over temperature is maintained to partially dehydrate the initial copperas starting material. In the first stage of which copperas obtained from a titanium dioxide manufacturing process is heated to a temperature of from 32° C. to 38° C. to produce a free-flowing and substantially aggregate-free product. This operation is carried out by passing a heated gas, such as air, through a bed of copperas so as to fluidize the bed. Low-grade heat is usable and conveniently the gas need only have a temperature in the range 70° C. to 80° C. to produce the desired treated copperas. Waste gas from a subsequent process stage can be employed.

The initially heated copperas is transferred in the continuous process to a second fluid bed apparatus where, while being maintained a fluid suspension it is heated to a higher temperature in the range 40° C. to 50° C. to commence removal of water of crystallization of the copperas. Again relatively low grade heat can be used but naturally since a higher temperature is required the heating and fluidizing gas is maintained at a somewhat higher temperature than in stage (a). Typically the heating and fluidizing gas will have a temperature of say 115° C. to 180° C. to produce a preferred copperas temperature of about 45° C. During this second stage (b) the heating is continued until the amount of the water of crystallization has fallen to below 6 mols per mole of $FeSO_4$, say about 5.2 to 5.8 mols $H_2O$ per mol $FeSO_4$.

The fluidized copperas having the reduced amount of water of crystallization is then transferred in the continuous process to another fluid bed apparatus when the temperature of the material is increased to a value of from 54° C. to 65° C. to complete the partial removal of water of crystallization to produce a partially dehydrated product containing from 3.8 to 5.2 mols of $H_2O$ per mol $FeSO_4$. Heating and fluidization is preferably effected by heated air having a temperature of from 100° C. to 300° C.

The partially dehydrated product is then oxidized by heating in a fluidized bed at a temperature of from 150° C. to 300° C. in an oxidizing atmosphere until at least 85% of the weight of $Fe^{2+}$ has been oxidized to $Fe^{3+}$. In a continuous process the partially dehydrated product is continuously withdrawn from the third fluidized bed to a fourth fluidized bed and the temperature raised by the introduction of the heated fluidizing oxidizing gas. If desired an auxilliary source of heat may be required and this can be provided by an immersion heater within the bed which can be supplied with a heated liquid say an appropriate oil or a hot gas. Oxidation is carried out preferably until at least 90% of the weight of ferrous iron is converted to the ferric form. The oxidized product is known as basic ferric sulphate i.e. the mole ratio of $SO_4:Fe^{3+}$ is less than 1.5:1.

The basic ferric sulphate in a continuous process is then transferred to another fluid bed apparatus where it is maintained in fluid suspension by the passage therethrough of a heated gas and at a temperature of 120° C. to 220° C. To the fluidized basic ferric sulphate concentrated sulphuric acid is added until the mole ratio $SO_4:Fe^{3+}$ is greater than 1.5:1. Usually the acid has an elevated temperature not greater than 250° C. and preferably of up to 100° C. The acid can be heated by say a steam heated exchanger but preferably it is heated by a waste source. The acid ferric sulphate is then cooled by transferring to a final fluidized bed apparatus by using air at ambient temperature to effect cooling while maintaining the fluidized state. Waste heat recovered can be used in any appropriate earlier heating stage.

The process of the invention can most advantageously be carried out adjacent the site of the source of copperas and waste heat. Most advantageously the process is carried out in or adjacent to a factory for the production of titanium dioxide pigment by the so-called 'sulphate' process. In this process copperas is produced as a by-product and waste heat is recoverable from calciner off-gases. These gases normally prior to scrubbing contain sulphuric acid vapours and can be used most advantageously to effect heating of the partially dehydrated ferrous sulphate during the oxidation stage. Alternatively waste gases from the acidification stage can be used also as a source of gases containing sulphuric acid. In this stage the gases are cooled and then initiate deposition of sulphuric acid which actually takes place in the following acidification stage where usually a lower temperature is permissible. It is also believed that droplets of acid actually also act as catalyst in the oxidation stage. This use of calciner off-gas or other waste gases to supply some heat during the oxidation stage and subsequent acidification stage not only in advantageous in improving the thermal efficiency of the titanium dioxide manufacturing process but reduces the amount of concentrated sulphuric acid required to be added separately and is an important contribution to the reduction of effluent.

Waste gas from these later stages of oxidation and acidification can be recycled to earlier and cooler stages so that the process as a whole has a much improved thermal efficiency.

The solid finely divided ferric sulphate obtained by the process of the invention is useful in the treatment of domestic sewage or potable water treatment to provide a source of sulphate ions and in the treatment of clays and like soils to effect agglomeration of the clay masses into small particulate material having enhanced workability.

The invention is illustrated in the following Examples.

EXAMPLE 1

Copperas $FeSO_4.7H_2O$ was placed in a fluid bed apparatus and air at 70° C. passed upwardly through the bed to maintain the bed in fluid suspension until the product was free flowing and substantially free of aggregates.

The product was then fluidizied again with hot air at an increased temperature of 120° C. to raised the temperature to 44° C. to commence to remove water of crystallisation until the product contained the equivalent of 5.5 mols $H_2O$ per mol $FeSO_4$.

This product was then fluidised again using air at 120° C. to raise the temperature to 60° C. until a partially dehydrated product containing 4 molecules $H_2O$ per molecule $FeSO_4$ was obtained.

The partially dehydrated product was then further fluidized using air at 250° C. and additional heat from an immersion heater to raise the temperature of the fluidized material to 250° C. When 85% to 90% by weight of this material had been oxidized to ferric sulphate this oxidation step was completed.

The oxidized product was then fluidized at a lower temperature of 180° C. to 200° C. by air at 200° C. and 96% w/w sulphuric acid added to produce a product having a mol ratio $SO_4:Fe^{3+}$ of 1.55.

The acid product was fluidized with air at ambient temperature to cool the product to 40° C. when it was discharged.

EXAMPLE 2

Copperas, $FeSO_4.7H_2O$, was placed in a fluid bed drier and heated to a temperature about 36° C. employing air at a temperature of about 81° C. to effect fluidization to produce a free-flowing product.

The product was heated while fluidized to a temperature of about 42° C. with air heated to about 117° C. to partially dry the copperas.

When the product contained on analysis approximately 5.7 mols $H_2O$ per mol $FeSO_4$ the temperature was increased to about 62° C. with fluidizing air at a temperature of about 167° C. to produce a product containing about 3.9 mols $H_2O$ per mol $FeSO_4$.

This partially dehydrated product was then further fluidized in a current of air at an average temperature of about 366° C. to heat the product to about 240° C. to oxidize the product to produce a product in which about 88% by weight had been converted to basic ferric sulphate.

The oxidized product was treated at a temperature of about 138° C. with 96% w/w sulphuric acid to produce a product having an analysis of 26.00% ferric iron, 1.69% ferrous iron and 1.87% free $H_2SO_4$. The product was then cooled while maintaining in fluid suspension.

The products of Example 1 and 2 were eminently suitable for the treatment of domestic sewage.

I claim:

1. A process for the production of an acidic ferric sulphate which comprises:
    (a) establishing a bed of ferrous sulphate heptahydrate and passing a heated gas through the bed to fluidize the bed and to heat the said ferrous sulphate to a temperature of from 32° C. to 38° C. to produce a free flowing and substantially aggregate-free product,
    (b) increasing the temperature of the fluidized $FeSO_4.7H_2O$ to a value within the range 40° C. to 50° C. to commence to remove water of crystallization of said $FeSO_4.7H_2O$,
    (c) when the amount of water of crystallization has fallen to less than 6 mols $H_2O$ per mol $FeSO_4$ increasing the temperature to a value of from 54° C. to 65° C. to complete the reduction of the amount of water of crystallization to produce a partially dehydrated product containing from 3.8 to 5.2 mols $H_2O$ per mol $FeSO_4$ while maintaining the material in steps (b) and (c) in fluid suspension,
    (d) heating the partially dehydrated product to a temperature of from 150° C. to 300° C. while maintaining the partially dehydrated product in fluid suspension by passing through the product an oxygen containing gas to oxidize at least 85% by weight $Fe^{2+}$ to $Fe^{3+}$,
    (e) adding to the oxidized product concentrated sulphuric acid in an amount sufficient to increase the mole ratio $SO_4:Fe^{3+}$ to at least 1.5:1 while maintaining the product in fluid suspension and at a temperature of 120° C. to 220° C., and
    (f) cooling the oxidized and acidified product while maintaining the product in fluid suspension to produce a solid free-flowing ferric sulphate having a mole ratio $SO_4:Fe^{3+}$ of at least 1.5:1.

2. A process according to claim 1 in which in (a) the heated gas is air and has a temperature of 70° C. to 80° C.

3. A process according to claim 1 in which in (a) waste gas from a subsequent process stage is used as the heated gas.

4. A process according to claim 1 in which in (b) the fluidized $FeSO_4.7H_2O$ is heated with a gas having a temperature of 115° C. to 180° C.

5. A process according to claim 1 in which in (b) the heating is continued until the amount of the water of crystallization has fallen to between 5.8 and 5.2 mols $H_2O$ per mol $FeSO_4$.

6. A process according to claim 1 in which in (c) the $FeSO_4$ is heated and fluidized by means of a gas having a temperature of from 100° C. to 300° C.

7. A process according to claim 1 in which in (d) the oxidation is carried out until at least 90% of the weight of ferrous iron is converted to the ferric form.

8. A process according to claim 1 in which in (e) the sulphuric acid has a temperature not greater than 250° C.

9. A process according to claim 8 in which the acid has a temperature of up to 100° C.

10. A process according to any one of the preceding claims in which waste gases from the acidification stage (e) is used as a source of heat in the oxidation stage (d).

* * * * *